United States Patent

Farrissey, Jr. et al.

[11] 4,257,996
[45] Mar. 24, 1981

[54] PROCESS FOR PREPARING PARTICLE BOARD AND POLYISOCYANATE-PHOSPHORUS COMPOUND RELEASE AGENT COMPOSITION THEREFOR

[75] Inventors: William J. Farrissey, Jr., Northford; Alexander McLaughlin, Meriden; Reinhard H. Richter, North Haven; Curtis P. Smith, Cheshire; Benjamin W. Tucker, Bethany, all of Conn.

[73] Assignee: The Upjohn Company, Kalamazoo, Mich.

[21] Appl. No.: 139,872

[22] Filed: Apr. 14, 1980

[51] Int. Cl.³ .................. B29J 5/02; C08G 18/28; C08L 1/02
[52] U.S. Cl. ..................... 264/122; 252/182; 260/9; 264/109; 528/51; 528/72; 528/75
[58] Field of Search .......................... 260/9

[56] References Cited

U.S. PATENT DOCUMENTS

| | | | |
|---|---|---|---|
| 3,870,665 | 3/1975 | Diehr et al. | 260/17.2 |
| 3,919,017 | 11/1975 | Shoemaker et al. | 156/62.2 |
| 3,943,075 | 3/1976 | Fishbein et al. | 528/51 |
| 4,005,034 | 1/1977 | Weil | 528/51 |
| 4,024,088 | 5/1977 | Godlewski | 528/51 |
| 4,100,328 | 7/1978 | Gallagher | 264/122 |

*Primary Examiner*—Edward M. Woodberry
*Attorney, Agent, or Firm*—Denis A. Firth; John Kekich

[57] ABSTRACT

The use of polyisocyanates as binders in the preparation of particle boards is subject to the drawback that the boards exhibit a tendency to adhere to the face of the platens used in their formation. This problem is minimized by utilizing, in association with the polyisocyanate to be used as binder, minor amounts of one or more phosphates or thiophosphates of the formula:

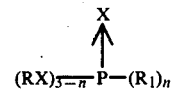

where R=alkyl (C₃ and higher), alkenyl (C₃ and higher), aryl, alkyl-substituted aryl,

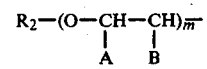

(where $R_2$ is alkyl, aryl, or alkyl-substituted aryl, A and B are H, methyl, chloromethyl, 2,2,2-trichloromethyl, m=1–25) and lower-alkyl substituted by from 1 to 2 acyloxy groups where acyl is the residue of an aliphatic carboxylic acid having at least 2 carbon atoms; $R_1$ is Cl, Br, lower-alkoxy, lower-alkylmercapto, arylamino, mono(lower-alkyl)amino, di(lower-alkyl)amino, hydroxy(lower-alkylene)oxy, aryloxy, hydrocarbylureido, and an enol residue; X=O or S and n=1 or 2. The polyisocyanates and the phosphates or thiophosphates are applied to the particles separately, or after preblending one with the other. Whether the components are applied separately or in combination one with the other, they can each be applied either neat or in the form of an emulsion or emulsions.

22 Claims, No Drawings

PROCESS FOR PREPARING PARTICLE BOARD AND POLYISOCYANATE-PHOSPHORUS COMPOUND RELEASE AGENT COMPOSITION THEREFOR

CROSS-REFERENCE TO RELATED APPLICATIONS

Copending application Ser. No. 134,315 filed Mar. 26, 1980, which is a continuation-in-part of application Ser. No. 35,647 filed May 3, 1979, now abandoned, describes and claims the use of certain acid phosphates, and the corresponding pyrophosphates, as internal release agents for particle board formation using polyisocyanates as the binder resin.

BACKGROUND OF THE INVENTION

1. Field of the Invention

This invention relates to particle board binders and is more particularly concerned with the use of organic polyisocyanates as particle board binders, with compositions for said use, and with the particle boards so prepared.

2. Description of the Prior Art

The use is now widely recognized of organic polyisocyanates, particularly toluene diisocyanate, methylenebis(phenyl isocyanate), and polymethylene polyphenol polyisocyanates, as binders, or as a component of a binder, for the preparation of particle boards; see, for example, U.S. Pat. Nos. 3,428,592; 3,440,189; 3,557,263; 3,636,199; 3,870,665; 3,919,017 and 3,930,110.

In a typical process the binder resins, optionally in the form of a solution or aqueous suspension or emulsion, are applied to or admixed with the particles of cellulosic material, or other types of material capable of forming particle boards, using a tumbler apparatus or blender or other form of agitator. The mixture of particles and binder is then formed into a mat and subjected to heat and pressure using heated platens. The process can be carried out in a batch operation or continuously. To avoid adhesion of the board so formed to the heated platens it has hitherto been necessary to interpose a sheet, impermeable to isocyanate, between the surface of the board and the platen during the forming process, or to coat the surface of the platen, prior to each molding operation, with an appropriate release agent or to coat the surface of the particles themselves with a material which will not adhere to the platen. Any of these alternatives, particularly where the process is being operated on a continuous basis, is cumbersome and a drawback to what is otherwise a very satisfactory method of making a particle board with highly attractive structural strength properties.

We have now found that the above drawbacks to the use of organic isocyanates as particle board binders can be minimized in a very satisfactory manner by incorporating certain phosphorus-containing compounds as internal release agents in the isocyanate compositions so utilized. We are aware of U.S. Pat. No. 4,024,088 which describes the incorporation of certain phosphorus-containing compounds as internal release agents in the preparation of polyether polyurethanes.

SUMMARY OF THE INVENTION

This invention comprises an improved process for the preparation of particle board in which particles of organic material capable of being compacted are contacted with a polyisocyanate and the treated particles are subsequently formed into boards by the application of heat and pressure, wherein the improvement comprises contacting said particles, in addition to the treatment with polyisocyanate, with from about 0.1 to 20 parts, per 100 parts by weight of polyisocyanate, of a phosphate of the formula:

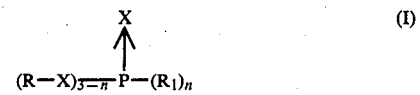

wherein R represents a member selected from the class consisting of alkyl having at least 3 carbon atoms, alkenyl having at least 3 carbon atoms, aryl, aryl substituted by at least one alkyl, lower-alkyl substituted by from 1 to 2 acyloxy groups wherein the acyl group is the residue of an aliphatic monocarboxylic acid having at least 2 carbon atoms, and

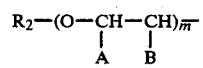

wherein $R_2$ is selected from the class consisting of alkyl, aryl, and aryl substituted by at least one alkyl, one of A and B represents hydrogen and the other is selected from the class consisting of hydrogen, methyl, chloromethyl and 2,2,2-trichloroethyl, and m is a number having an average value from 1 to 25;

$R_1$ is a member selected from the class consisting of chlorine, bromine, lower-alkoxy, lower-alkylmercapto, arylamino, mono(lower-alkyl)amino, di(lower-alkyl)amino, hydroxy(lower-alkylene)oxy, aryloxy, hydrocarbylureido and an enol residue of the formula:

wherein $R_3$ is hydrocarbyl and $R_4$ is selected from the class consisting of hydrogen, hydrocarbyl, alkoxy and carbalkoxy, and $R_3$ and $R_4$ taken together also represent the residue of a cycloalkenyl group;

X is a chalcogen selected from the class consisting of oxygen and sulfur; and n is an integer from 1 to 2; provided that, when n=1, one of the two R groups can also be selected from methyl and ethyl, and further provided that, when n=1, the two RX groups, taken together with the P atom to which they are attached, can additionally form the residue of a heterocyclic nucleus having from 5 to 6 ring atoms.

The invention also comprises novel compositions comprising organic polyisocyanates having incorporated therein one one more of the aforesaid compounds. The invention also comprises particle board prepared in accordance with the aforesaid process.

The term "alkyl having at least 3 carbon atoms" means a saturated monovalent aliphatic radical, straight chain or branched chain, which has the stated minimum number of carbon atoms in the molecule. Illustrative of such groups are propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, pentacosyl, hexacosyl, heptacosyl, octacosyl, nonacosyl, triacontyl, pentatriacontyl, and the like, including isomeric forms thereof.

The term "alkenyl having at least 3 carbon atoms" means a monovalent straight or branched chain aliphatic radical containing at least one double bond, and having the stated minimum number of carbon atoms in the molecule. Illustrative of such groups are allyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, pentacosenyl, triacontenyl, pentatriacontenyl, and the like, including isomeric forms thereof.

The term "aryl" means the radical obtained by removing a hydrogen atom attached to a nuclear carbon atom of an aromatic hydrocarbon. Illustrative of aryl are phenyl, naphthyl, biphenylyl, triphenylyl, and the like. The term "aryl substituted by at least one alkyl" means an aryl radical, as above defined, carrying at least one alkyl group such as methyl, ethyl, and the alkyl groups exemplified above. Illustrative of such radicals are tolyl, m-xylyl, p-ethylphenyl, m-butylphenyl, p-isohexylphenyl, m-octylphenyl, p-nonylphenyl, o-nonylphenyl, 2-methyl-α-naphthyl, 3-ethyl-α-naphthyl, and the like. The term "lower-alkoxy" means alkoxy having from 1 to 6 carbon atoms, inclusive, such as methoxy, ethoxy, propoxy, butoxy, pentoxy, hexyloxy and isomeric forms thereof. The term "lower-alkyl" means alkyl having from 1 to 6 carbon atoms, inclusive, such as methyl, ethyl, propyl, butyl, pentyl, hexyl and isomeric forms thereof. The term "lower-alkylmercapto" means alkylmercapto from 1 to 6 carbon atoms, inclusive, such as methylmercapto, ethylmercapto, propylmercapto, butylmercapto, pentylmercapto, hexylmercapto and isomeric forms thereof. The term "aryloxy" means the radical ArO— wherein Ar is aryl as defined above. The term "aliphatic monocarboxylic acid having at least 2 carbon atoms" means saturated and unsaturated aliphatic carboxylic acids having the stated minimum number of carbon atoms such as acetic, propionic, butyric, caproic, caprylic, pelargonic, capric, lauric, myristic, palmitic, stearic, docosanoic, tricosanoic, tetracosanoic, pentacosanoic, hexacosanoic, heptacosanoic, octacosanoic, nonacosanoic, triacontanoic, hentricontanoic, dotriacontanoic, octenoic, decenoic, undecenoic, tetradecenoic, oleic, decosenoic, tricosenoic, tetracosenoic, pentacosenoic, octacosenoic, triacontenoic, dotriacontenoic acids, and the like. The term "hydroxy(lower-alkylene)oxy" means a radical of the formula HO—$C_{n'}H_{2n'}$O— wherein $C_{n'}H_{2n'}$ represents alkylene from 1 to 6 carbon atoms, inclusive, such as methylene, ethylene, propylene, butylene, pentylene, hexylene and isomeric forms thereof.

The terms "arylamino", "mono(lower-alkyl)amino," and "di(lower-alkylamino)" means an amino group substituted by aryl, as hereinbefore defined, or lower-alkyl as hereinbefore defined.

The term "hydrocarbyl" means the monovalent radical obtained by removing one hydrogen atom from the parent hydrocarbon. Illustrative of such groups are alkyl and alkenyl, both as hereinbefore defined; aralkyl such as benzyl, phenylpropyl, phenethyl, naphthylmethyl, phenyldodecyl, and the like; aryl and aryl substituted by alkyl, both as hereinbefore defined; cycloalkyl such as cyclobutyl, cyclopentyl, cyclohexyl, cycloheptyl, cyclooctyl, and the like, including isomeric forms thereof; and cycloalkenyl such as cyclopentenyl, cyclohexenyl, cycloheptenyl, cyclooctenyl and the like including isomeric forms thereof.

The term "heterocyclic nucleus having from 5 to 6 ring atoms" means the group of the formula:

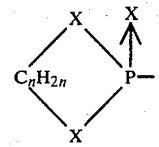

wherein X is as above defined and $C_nH_{2n}$ is alkylene having 2 to 3 carbon atoms in the chain and having up to a total of 18 carbon atoms in the radical. Illustrative of alkylene are ethylene, 1,3-propylene, 1,2-butylene, 1,2-hexylene, 2-methyl-1,3-octylene, 2,5-diethyl-1,3-hexylene, 2,4-dihexyl-1,3pentylene and the like.

The term "hydrocarbylureido" means the group

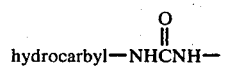

wherein hydrocarbyl is as above defined. The term "carbalkoxy" means the group

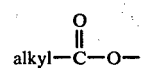

wherein alkyl is as above defined.

The term "alkoxy" means the group —O—Alkyl, wherein alkyl is as hereinbefore defined, and is inclusive of lower-alkoxy as defined above.

Each of the groups R, $R_1$, $R_2$, $R_3$ and $R_4$ in the various formulae set forth above, except of course the case in which $R_1$ represents chlorine or bromine, can optionally be substituted by one or more inert substituents which do not contain active hydrogen atoms and which are therefore unreactive in the presence of the polyisocyanate. Illustrative of such inert substituents are alkoxy, alkylmercapto, alkenyloxy, alkenylmercapto, chloro, bromo, iodo, fluoro, cyano, and the like.

DETAILED DESCRIPTION OF THE INVENTION

The process of the invention is carried out substantially in accordance with methods previously described in the art in which an organic polyisocyanate is used as the binder resin, or as a component thereof, (see, for example German Offenlegungsschrift No. 2610552 and U.S. Pat. No. 3,428,592) with the chief exception that a phosphate or thiophosphate of the formula (I) is employed in combination with the isocyanate composition used to treat the particles which are to be bonded together to form the particle board.

Thus, particle board is produced according to the invention by bonding together particles of wood, or other cellulosic or organic or inorganic material capable of being compacted using heat and pressure, in the presence of a binder system which comprises a combination of an organic polyisocyanate and a phosphate or thiophosphate (I) hereinafter referred to as the "phosphate release agent."

The polyisocyanate and the phosphate release agent can be brought into contact with the particles as separate, individual components or, in a preferred embodiment, the polyisocyanate and phosphate are brought into contact with the particles either simultaneously or after admixture. Whether the polyisocyanate and phosphate are introduced separately or in admixture, they can be employed neat, i.e. without diluents or solvents, or one or other or both can be employed in the form of aqueous dispersions or emulsions.

The polyisocyanate component of the binder system can be any organic polyisocyanate which contains at least two isocyanate groups per molecule. Illustrative of organic polyisocyanates are diphenylmethane diisocyanate, m- and p-phenylene diisocyanates, chlorophenylene diisocyanate, α,α'-xylylene diisocyanate, 2,4- and 2,6-toluene diisocyanate and the mixtures of these latter two isomers which are available commercially, triphenylmethane triisocyanates, 4,4'-diisocyanatodiphenyl ether, and polymethylene polyphenyl polyisocyanates. The latter polyisocyanates are mixtures containing from about 25 to about 90 percent by weight of methylenebis(phenyl isocyanate) the remainder of the mixture being polymethylene polyphenyl polyisocyanates of functionality higher than 2.0. Such polyisocyanates and methods for their preparation are well-known in the art; see, for example, U.S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

The polymethylene polyphenyl polyisocyanates are the preferred polyisocyanates for use in the binder systems of the invention. Particularly preferred polymethylene polyphenyl polyisocyanates are those which contain from about 35 to about 65 percent by weight of methylenebis(phenyl isocyanate).

When the organic polyisocyanate is to be employed as a binder system in the form of an aqueous emulsion or dispersion in accordance with the invention, the aqueous emulsion or dispersion can be prepared using any of the techniques known in the art for the preparation of aqueous emulsions or dispersions, prior to use of the composition as the binder. Illustratively, the polyisocyanate is dispersed in water in the presence of an emulsifying agent. The latter can be any of the emulsifying agents known in the art including anionic and nonionic agents. Illustrative of nonionic emulsifying agents are polyoxyethylene and polyoxypropylene alcohols and block copolymers of two or more of ethylene oxide, propylene oxide, butylene oxide, and styrene; alkoxylated alkylphenols such as nonylphenoxy poly(ethyleneoxy)ethanols; alkoxylated aliphatic alcohols such as ethoxylated and propoxylated aliphatic alcohols containing from about 4 to 18 carbon atoms; glycerides of saturated and unsaturated fatty acids such as stearic, oleic, and ricinoleic acids and the like; polyoxyalkylene esters of fatty acids such as stearic, lauric, oleic and like acids; fatty acid amides such as the dialkanolamides of fatty acids such as stearic, lauric, oleic and like acids. A detailed account of such materials is found in Encyclopedia of Chemical Technology, Second Edition, Vol. 19, pp 531–554, 1969, Interscience Publishers, New York.

The formation of the emulsion or dispersion can be carried out at any time prior to its use as the binder composition, but preferably, it is carried out within about 3 hours prior to use. Any of the methods conventional in the art for the preparation of aqueous emulsions can be used in preparing the aqueous polyisocyanate emulsions employed in the process of the invention. Illustratively, the emulsion is formed by bringing the polyisocyanate, emulsifying agent and water together under pressure using a conventional spray gun in which the streams of water and polyisocyanate impinge and are mixed under turbulent conditions in the mixing chamber of the spray gun. The emulsion so formed is discharged in the form of a spray which is applied to the particles to be formed into boardstock in the manner discussed below.

As discussed above, the phosphate release agent can be brought into contact with the particles as a separate component in which case it is employed in neat form, i.e. without diluents, or as an aqueous solution or dispersion. Preferably the release agent, either neat, or in diluted form when used alone, i.e. separately from the polyisocyanate, is presented to the particles in the form of a spray. However, in a preferred embodiment of the invention the release agent and the polyisocyanate are employed together in a single composition. This can be accomplished in several ways. Thus, when the polyisocyanate is employed as binder resin without diluents such as water, the release agent can be incorporated in the polyisocyanate by simple admixture. Where the polyisocyanate is employed as binder resin in the form of an aqueous emulsion the release agent can be added as a separate component during the formation of the emulsion or after its formation or, in a particularly advantageous embodiment, the release agent is premixed with the organic polyisocyanate prior to emulsification of the latter. Thus, the organic polyisocyanate and the release agent can be premixed and stored for any desired period prior to formation of the emulsion. Further, when an emulsifying agent is employed in preparation of the emulsion said agent can also be incorporated into the mixture of organic polyisocyanate and release agent to form a storage stable composition which can be converted, at any desired time, to an aqueous emulsion for use as a binder resin by simple admixture with water.

When the polyisocyanate is employed as binder in the form of an aqueous emulsion, the proportion of organic polyisocyanate present in the said aqueous emulsion is advantageously within the range of about 0.1 to about 99 percent by weight and preferably within the range of about 25 to about 75 percent by weight.

Whether the release agent is introduced as a separate component or in combination with the polyisocyanate, the proportion of release agent employed is within the range of about 0.1 to about 20 parts by weight, per 100 parts of polyisocyanate and, preferably, is within the range of about 2 to about 10 parts by weight, per 100 parts of polyisocyanate. The proportion of emulsifying agent required to prepare the aqueous emulsion is not critical and varies according to the particular emulsifying agent employed but is generally within the range of about 0.1 to about 20 percent by weight based on polyisocyanate.

The starting material for the particle board comprises particles of cellulosic and the like material capable of being compacted and bonded into the form of boards. Typical such materials are wood particles derived from lumber manufacturing waste such as planar shavings, veneer chips, and the like. Particles of other cellulosic material such as shredded paper, pulp or vegetable fibres such as corn stalks, straw, bagasse and the like, and of non-cellulosic materials such as shredded scrap rubber, polyurethane, polyisocyanurate and like cellular and non-cellular polymers can also be used. Inorganic materials such as hydrated alumina, gypsum, chopped mineral fibers and the like can also be employed, either alone or in combination with any of the above cellulosic or non-cellulosic materials, in the formation of particle boards in accordance with the present invention.

The moisture content of the particles suitably may range from about 0 to about 24 percent by weight. Typically, particles made from lumber waste materials contain about 10–20% moisture, and may be used without first being dried.

Particle board is fabricated by spraying the particles with the components of the binder composition, either separately or in combination, while the particles are tumbled or agitated in a blender or like mixing apparatus. Illustratively, a total of about 1 to 8% by weight of the binder system (excluding any water present therein) is added, based on the "bone dry" weight of the particles, but higher or lower amounts of binder resin may be used in any given application. Illustratively, where the particles are of large size, such as in chipboard and wafer board, it is possible to use amounts of binder as low as 1% by weight or even less based on the "bone dry" weight of the particles. Where the particles are very small, i.e. have a high surface area to volume ratio as in the case of powdered inorganic materials, it is desirable to use amounts of binder as high as about 20 percent by weight or even higher. If desired, other materials, such as wax sizing agents, fire retardants, pigments and the like, may also be added to the particles during the blending step.

After blending sufficiently to produce a uniform mixture the coated particles are formed into a loose mat or felt. The mat is then placed in a heated press between caul plates and compressed to consolidate the particles into a board. Pressing times, temperatures and pressures vary widely depending on the thickness of the board produced, the desired density of the board, the size of the particles used, and other factors well known in the art. By way of example, however, for $\frac{1}{2}''$ thick particle board of medium density, pressures of about 300 to 700 psi and temperatures of about 325°–375° F. are typical. Pressing times are typically about 2–5 minutes. Because a portion of the moisture present in the mat reacts with polyisocyanate to form polyurea, as described earlier, the level of moisture present in the mat is not as critical with isocyanate binders as with other binder systems.

The above-described process can be carried out on a batch basis, i.e. individual sheets of particle board can be molded by treating an appropriate amount of particles with the binder resin combination and heating and pressing the treated material. Alternatively, the process can be carried out in a continuous manner by feeding treated particles in the form of a continuous web or mat through a heating and pressing zone defined by upper and lower continuous steel belts to which, and through which, the necessary heat and pressure are applied.

Whether the process of the invention is carried out in a batchwise or continous manner, it is found that the particle board produced using the polyisocyanate and release agent combination of the invention is released readily from the metal plates of the press used in its formation and shows no tendency to stick or adhere to said plates. This is in direct contrast to previous experience with the use of polyisocyanates alone as binder resins as discussed above.

While any of the phosphate release agents defined hereinbefore can be used, either along or in combination, in the process of the invention, it is preferred to use compounds of type

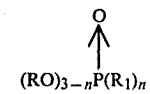

$$(RO)_{3-n}P(R_1)_n$$

in which R is alkyl having at least 3 carbon atoms or aryl substituted by alkyl as hereinbefore defined; $R_1$ is chlorine, lower-alkoxy, mono(lower-alkyl)amino,di(-lower-alkyl)amino, aryloxy, or an enol residue of the formula (II), and n is an integer from 1 to 2.

It is believed that the compounds of formula (I) act as release agents in accordance with the process of the invention by reason of the ready hydrolysis of said compounds, under the conditions employed in the preparation of the particle boards using the process described herein, to yield the corresponding acid phosphates of the formula

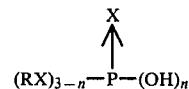

$$(RX)_{3-n}-P-(OH)_n$$

wherein R, X, and n have the significance above defined. The latter compounds are themselves useful as internal release agents in polyisocyanate binders for particle board as is described in copending application Ser. No. 35,647 filed May 3, 1979. It is to be understood, however, that the above statement is offered by way of explanation only and is not to be construed as limiting the scope of the present invention in any way.

The compounds of formula (I), which are employed in the process of the invention, can be prepared by conventional procedures known in the art. Illustratively, the appropriate alcohol or thiol RXH, wherein R has the significance hereinbefore defined, is reacted with the appropriate phosphoryl or thiophosphoryl halide $PXHal_3$ wherein X represents O or S and Hal represents chlorine or bromine, to give, as the principal reaction product, the compound

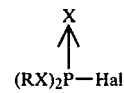

$$(RX)_2P-Hal$$

wherein R, X and Hal are as above defined. A minor amount of the compound

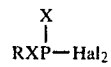

$$RXP-Hal_2$$

will also be formed as a by-product. These compounds correspond to the compounds of formula (I) wherein $R_1$ represents chlorine or bromine and n is 1 or 2, respectively. If desired, these two compounds can be separated by conventional procedures and converted, by further reactions described below, to other compounds within formula (I). Alternatively, and preferably, the mixture of the two compounds is used without separation as a release agent in accordance with the invention or as an intermediate in the preparation of other compounds of formula (I) as described below.

In a particular embodiment the reaction of the appropriate alcohol RXH, where R and X have the significance above defined, with the appropriate phosphoryl or thiophosphoryl halide can be carried out in the presence of the polymethylene polyphenyl polyisocyanate which is to be used as the particle binder in accordance with the invention thereby yielding the polyisocyanate with release agent produced in situ.

The individual compounds

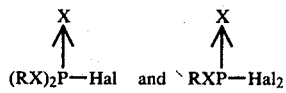

prepared as described above, or the mixture of the two compounds, are reacted with the appropriate lower-alkanol, lower-alkanol substituted by 1 or 2 acyloxy groups, phenol, lower-alkylmercaptan, arylamine, mono- or di-(lower-alkyl)amine, or lower-alkylene glycol, to give the appropriate compounds of formula (I) wherein n is 1 or 2. The reactions are all carried out by conventional procedures, advantageously in the presence of an inert solvent. Generally, the halophosphate

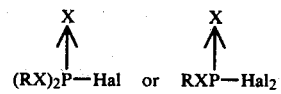

is added dropwise to the solution of the other reactant in an inert solvent such as benzene, toluene, xylene, and the like. In the case of the alkanol or alkylmercaptan the reactions are usually exothermic and require external cooling whereas, in other cases, the application of heat up to a temperature of about 100° C. is sometimes required in order to carry the reaction to completion. Optionally a tertiary amine such as triethylamine, pyridine, and the like is employed to facilitate the reaction by removal of the hydrogen halide which is eliminated in the reaction. The desired product is isolated by conventional procedures, for example, by filtration to remove any tertiary amine hydrochloride, followed by evaporation of the inert solvent.

Where a mixture of mono and dihalophosphate or thiophosphate is used as starting material in the reaction the reaction product will be a mixture of the corresponding compounds of formula (I) in which n is 1 or 2. This mixture can be separated into its individual components by conventional procedures such as chromatography, if desired, or, preferably, the mixture is used, without further separation or other treatment, as a release agent in accordance with the invention.

Those compounds of formula (I) in which $R_1$ represents the enol residue (II) are prepared by reacting the appropriate tri(hydrocarbyl)phosphite with the appropriate α-haloketone using the procedure described by Lichtenthaler, Chem. Review, 61, p. 607 et seq., 1961 as further illustrated in the Preparation 6 below.

Those compounds of the formula (I) in which $R_1$ represents hydrocarbylureido and n=1 can be prepared by reaction of the appropriate hydrocarbylamine with the appropriate isocyanate

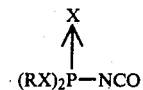

under conditions conventional in the art for the reaction of isocyanates and amines to form ureas. The isocyanates employed as the starting materials are, for the most part, known in the art and are prepared by methods known in the art: see, for example, Houben-Weyl, Organophosphorus Compounds, Part 2, Fourth Edition, 1964, p. 495.

In a further embodiment of the invention it is found that the combination of polyisocyanate and release agent employed as binder in the process of the invention can be used in conjunction with thermosetting resin binders hitherto employed in the art such as phenol-formaldehyde, resorcinol-formaldehyde, melamine-formaldehyde, urea-formaldehyde, urea-furfural and condensed furfuryl alcohol series. Not only does the use of such a combination avoid the problems of adhesion of the finished particle boards to the platens of the press, which problems were previously encountered with a blend of isocyanate and the above type of thermosetting resin binder, but the physical properties of the particle boards so obtained and markedly improved by the use of the combination.

The following preparations and examples describe the manner and process of making and using the invention and set forth the best mode contemplated by the inventors of carrying out the invention but are not to be construed as limiting.

PREPARATION 1

Dilauryl chlorophosphate

A solution of 559 g. (3 mole) of lauryl alcohol in 500 ml. of toluene was stirred under an atmosphere of nitrogen while a total of 203.25 g. (1.5 mole) of phosphorus oxychloride was added dropwise over a period of 1 hour. The reaction mixture was maintained at 10°-14° C. by external cooling during the addition. The temperature of the mixture was allowed to rise to ambient temperature (circa 20° C.) and the mixture was allowed to stand overnight. Thereafter the mixture was heated to 88° C. for approximately 2 hours before distilling to remove the solvent. The last traces of solvent were removed by heating at 75° C. under high vacuum. The residue (685.7 g.) was a clear colorless liquid which was found to have a hydrolyzable chloride content of 7.2 percent (theory 7.83 percent).

PREPARATION 2

Methyl dilauryl phosphate

A solution of 5 g. (0.15 mole) of methanol and 12.12 g. (0.12 mole) of triethylamine in 200 ml. of toluene was stirred at ambient temperature (22° C.) and a total of 45.25 g. (0.1 mole) of dilauryl chlorophosphate (prepared as described in Preparation 1) was added dropwise over a period of 13 minutes. After the addition was complete, the reaction mixture was stirred for a further 1.5 hour at ambient temperature before being filtered to remove triethylamine hydrochloride (7.85 g.). The filtrate was heated to 95° C. for a few minutes before being cooled to 5° C. and filtered. The solid so isolated was a further 2.82 g. of triethylamine hydrochloride. The filtrate was evaporated to dryness and the residue was triturated with 150 ml. of ether. The insoluble material (triethylamine hydrochloride; 0.33 g.; total triethylamine hydrochloride=11 g.=80 percent theoretical) was removed by filtration and the filtrate was evaporated to dryness to yield 44 g. of methyl dilaurylphosphate which was found to contain 0.09 percent of hydrolyzable chlorine corresponding to the presence of 1.15 percent of starting material (dilauryl chlorophosphate).

PREPARATION 3 n-Butyl dilaurylphosphate

A solution of 8.14 g. (0.11 mole) of n-butyl alcohol and 12.12 g. (0.12 mole) of triethylamine in 200 ml. of toluene was stirred at ambient temperature (22° C.) while a total of 45.25 g. (0.1 mole) of dilauryl chlorophosphate (prepared as described in Preparation 1) was added dropwise over a period of 7 minutes.. The resulting mixture was heated to 100° C. and maintained at that temperature for 30 minutes with stirring. At the end of this time the reaction mixture was cooled to 5° C. and filtered to remove triethylamine hydrochloride (6.11 g.). The low amount of triethylamine hydrochloride appeared to indicate incomplete reaction. Accordingly, a further 8 g. of triethylamine was added to the filtrate and the latter was heated at 93°-101° C. for a further 1 hour. At the end of this time the mixture was cooled to 5° C. and filtered. There was thus obtained a further 3.5 g. of triethylamine hydrochloride. The filtrate was evaporated to dryness and the residue was triturated with 150 ml. of ether. The suspension was filtered to remove a further 0.18 g. of triethylamine hydrochloride and the residue was evaporated to dryness under reduced pressure to obtained 43.9 g. of n-butyl dilaurylphosphate.

PREPARATION 4 n-Octyl dilaurylphosphate

Using the procedure described in Preparation 3 but replacing the n-butyl alcohol there used by 13 g. (0.1 mole) of n-octanol, there was obtained n-octyl dilaurylphosphate in the form of a colorless liquid having a hydrolyzable chlorine content of 0.04 percent by weight representing the presence of 0.51 percent by weight of the starting dilaurylchlorophosphate.

PREPARATION 5

Dilauryl N,N-diethylphosphoramide

A solution of 7.3 g. (0.1 mole) of diethylamine and 12.12 g. (0.12 mole) of triethylamine in 200 ml. of toluene was stirred at ambient temperature (23° C.) while a total of 45.2 g. (0.1 mole) of dilaurylchlorophosphate (prepared as described in Preparation 1) was added dropwise over a period of 25 minutes. The resulting mixture was stirred for a further 1 hour at ambient temperature before being cooled to 10° C. and filtered. The solid so isolated was triethylamine hydrochloride (9.13 g.). The filtrate was evaporated to dryness and the residue was triturated with 150 ml. of ether. The solid which separated (triethylamine hydrochloride; 0.38 g.) was removed by filtration and the filtrate was evaporated to dryness, the last traces of volatile material being removed in vacuo. There was thus obtained 48.67 g. of dilauryl N,N-diethylphosphoramide.

PREPARATION 6

α-Styryl dilaurylphosphate

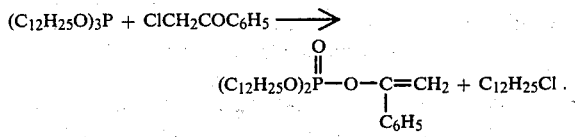

A mixture of 15.3 g. (0.1 mole) of α-chloroacetophenone and 58.6 g. (0.1 mole) of trilaurylphosphite was heated at 150° C. with stirring for a total of 10.5 hours. The resulting product was cooled to room temperature to obtain a mixture of α-styryl dilaurylphosphate and the lauryl chloride formed in the reaction. This mixture was not treated further before being used in the preparation of a particle board as described in Example 7.

PREPARATION 7

Dilauryl chlorophosphate prepared in the presence of polyisocyanate

To a charge of 91 g. (0.68 equivs.) of a polymethylene polyphenyl polyisocyanate [equivalent weight=133; functionality 2.8; containing circa 50 percent methylenebis(phenyl isocyanate)] was added 3.05 g. (0.02 mole) of phosphoryl chloride and the mixture was stirred under nitrogen while a total of 7.1 g. (0.04 mole) of lauryl alcohol was added in seven increments. A slight exotherm (maximum temperature 38° C.) occurred. The mixture was cooled to room temperature (approx. 20° C.) and allowed to stand until evolution of hydrogen chloride had ceased. The resulting solution of dilauryl chlorophosphate in polymethylene polyphenyl polyisocyanate was then used, without further treatment, in the preparation of a particle board as described in Example 9.

PREPARATION 8

Lauryl dichlorophosphate in the presence of polyisocyanate

Using the procedure described in Preparation 7 but utilizing 184.4 g. (1.38 equivs.) of the polymethylene polyphenyl polyisocyanate, 7.97 g. (0.052 mole) of phosphoryl chloride and 9.67 g. (0.052 mole) of lauryl alcohol, there was obtained a solution of predominantly lauryl dichlorophosphate in polymethylene polyphenyl polyisocyanate which was used, without further treatment, in the preparation of a particle board as described in Example 1.

PREPARATION 9

Mixture of hydroxypropyl dioleyl phosphate and di(hydroxypropyl) oleyl phosphate A total of 10 g. (0.17 mole) of propylene oxide was added dropwise but rapidly to a stirred solution of 50 g. (approx. 0.1 mole) of oleyl acid phosphate (a mixture of mono- and di-oleyl acid phosphates; Hooker Chemical Corporation) in 50 ml. of methylene chloride. The starting temperature of the mixture was 22° C. and this rose rapidly to 41° C. at which point refluxing began. The mixture was stirred for a further 1 hour after addition was complete and the temperature fell to 25° C. during this time. At the end of this period the volatile material was evaporated using a bath temperature of 50° C. leaving a colorless oil (60 g.) as residue which oil was a mixture of hydroxypropyl dioleyl phosphate and di(hydroxypropyl) oleyl phosphate.

PREPARATION 10

Solution of di(nonylphenyl) chlorophosphate in polyisocyanate

To a mixture of 2.9 g. (0.019 mole) of phosphorus oxychloride in 89 g. of polymethylene polyphenyl polyisocyanate [eq. wt.=133; containing circa 50 percent of methylenebis(phenyl isocyanate); functionality 2.8] was added, with stirring, 8.3 g. (0.038 mole) of nonylphenol. A slow exotherm occurred and the temperature of the reaction mixture reached 29° C. approximately 20 minutes after the addition was completed. The mixture was then heated slowly to 100° C. and maintained at 100°–115° C. for 1 hour during which time the reaction mixture suffered a total weight loss of 1.2 g. (87 percent of theory). The residue was cooled to room temperature to obtain a solution of di(nonylphenyl) chlorophosphate in polymethylene polyphenyl polyisocyanate.

PREPARATION 11

Bis(dioleoylglyceryl) chlorophosphate

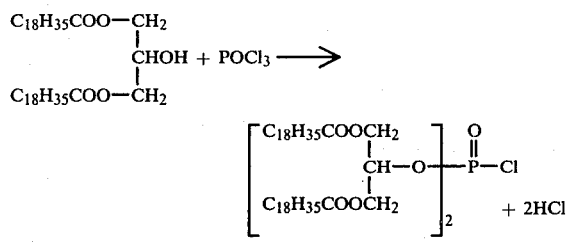

[The above equation shows the use of 1,3-dioleoyl glycerol as the starting material whereas the reaction described below employed a mixture of the 1,2- and 1,3-dioleoylglycerols as starting material.]

To a solution of 62 g. (0.104 mole) of diolein (a mixture of 1,2- and 1,3-dioleoyl glycerol) in 100 ml. of toluene maintained at circa 20° C. under an atmosphere of nitrogen, was added dropwise, over a period of 45 minutes, a solution of 7.7 g. (0.05 mole) of phosphorus oxychloride in 50 ml. of toluene. The mixture was stirred throughout the addition. After the addition was complete, the mixture was heated under reflux for 5 hours during which a sticky light resin formed on the walls of the flask. At the end of the heating period the bulk of the reaction mixture was decanted from the solid deposit and distilled to remove excess phosphorus oxychloride and toluene and leave a residue of bis(dioleoylglyceryl) chlorophosphate. The latter was then employed, without further treatment, in the preparation of a particle board as described in Example 11.

EXAMPLE 1

A specimen of wood particle board was prepared as follows:

A 1000 g. batch of ponderosa pine wood chips (Washington State University; ⅜" hammer-milled: 3.4 percent water content) was placed in a rotating blender drum and the drum was rotated while the particles were sprayed with an aqueous emulsion prepared by blending 48.3 g. of the solution of lauryl dichlorophosphate in polymethylene polyphenyl polyisocyanate (obtained as described in Preparation 8), 96.6 g. of water and 0.75 g. of emulsifying agent (aqueous solution of the sodium salt of styrene-maleic anhydride copolymer; 30 percent solids; Monsanto) using a Turrex mixer. The resulting emulsion was sprayed with a paint spray gun on to the wood particles while tumbling the latter for approximately 2 minutes to achieve homogeneity. 525 g. of the coated particles were formed into a felted mat on a 12"×12" cold-rolled steel plate with the aid of a plywood forming frame. After removal of the forming frame, steel bars, having a thickness (⅜") corresponding to the desired thickness of the final particle board, were placed along two opposing edges of the aforesaid steel plate and a second 12"×12" cold-rolled steel plate was placed on top of the mat. The complete assembly was then placed on the lower platen of a Dake press having a capacity of 100,000 lbs. of force. Both platens of the press were preheated to 340° F. Pressure was then applied to the platens. When the pressure reached 500 psi, it was maintained thereat for four minutes before being released. The particle board so formed was demolded and showed no tendency to stick or adhere in any way to the mold plates. This was in direct contrast to a particle board prepared in exactly the same manner but using the same polymethylene polyphenyl polyisocyanate without the lauryl dichlorophosphate or any other additive.

The particle board prepared in the above manner was found to have the following physical properties:

Density, pcf: 40
¹Modulus of rupture: psi: 1750
¹Dry internal bond: psi: 170
¹Tests carried out in accordance with ASTM-1037-72.

EXAMPLE 2

A specimen of wood particle board was prepared using the procedure described in Example 1 with the following changes. The wood particles employed were Ponderosa pine chips (Ellingson Lumber) having a water content of 10 percent by weight. A batch of 600 g. of these chips was sprayed, using the method and apparatus described in Example 1, with 30 g. of a mixture obtained by blending 91 g. of polymethylene polyphenyl polyisocyanate (equivalent weight=133; average functionality 2.6; PAPI ® 27; The Upjohn Company) and 9 g. of methyl dilaurylphosphate (prepared as described in Preparation 2). The sprayed particles (525 g.) were then pressed into a particle board of thickness ⅜" using the procedure described in Example 1 with a platen temperature of 340° F. and a pressure of 500 psi maintained for four minutes. The particle board so formed was demolded without showing any tendency to stick or adhere to the mold plates. The board was found to have the following physical properties:

Density, pcf: 41
¹Modulus of rupture, psi: 2330
¹Modulus of elasticity, psi: 292,000
¹Dry internal bond, psi: 164
¹Tests carried out in accordance with ASTM 1037-72.

EXAMPLE 3

A specimen of wood particle board was prepared using the procedure described in Example 1 with the following changes. The wood particles employed were Western cedar chips having a water content of 4 percent by weight. A batch of 700 g. of these chips was sprayed, using the method and apparatus described in Example 1, with a preblended mixture of 23.1 g. of polymethylene polyphenyl polyisocyanate (same as that used in Example 2) and 2.3 g. of the mixture of hydroxypropyl dioleyl phosphate and di(hydroxypropyl) oleyl phosphate prepared as described in Preparation 9.

An aliquot of 525 g. of the sprayed chips was pressed into a particle board of thickness ⅜″ using the procedure described in Example 1 with a platen temperature of 340° F. and a pressure of 500 psi maintained for four minutes. The particle board so formed was demolded without showing any tendency to stick or adhere to the mold plates.

EXAMPLE 4

A specimen of wood particle board was prepared using the procedure described in Example 1 with the following changes. The wood particles employed were ponderosa pine chips (same as used in Example 2) having a water content of 10 percent by weight. A batch of 1000 g. of these chips was sprayed, using the method and apparatus described in Example 1, with a preblended mixture of 45 g. of polymethylene polyphenyl polyisocyanate (see Example 1) and 5 g. of n-butyl dilauryl phosphate (prepared as described in Preparation 3). An aliquot of 525 g. of the sprayed chips was pressed into a particle board of thickness ⅜″ using the procedure described in Example 1 with a platen temperature of 350° F. and a pressure of 500 psi maintained for four minutes. The particle board so formed was demolded and showed excellent release properties with no sign of sticking to the mold plates. The board was found to have the following physical properties:

Density, pcf: 40
[1]Modulus of rupture, psi: 2190
[1]Modulus of elasticity, psi: 260,000
[1]Dry internal bond, psi: 180
[1]Tests carried out in accordance with ASTM 1037-72.

EXAMPLE 5

A specimen of wood particle board was prepared using the procedure described in Example 1 with the following changes. The wood particles employed were ponderosa pine chips (same as Example 2) having a water content of 10 percent by weight. A batch of 600 g. of these chips was sprayed, using the method and apparatus described in Example 1, with 30 g. of the solution of di(nonylphenyl) chlorophosphate in polymethylene polyphenyl polyisocyanate prepared as described in Preparation 10. 525 g. of the sprayed chips were then pressed into a particle board of thickness ⅜″ using the procedure described in Example 1 with a platen temperature of 340° F. and a pressure of 500 psi maintained for four minutes. The particle board so formed was demolded and showed good release from the mold plates. The board was found to have the following physical properties:

Density, pcf: 40
[1]Modulus of rupture, psi: 1670
[1]Modulus of elasticity, psi: 232,000
[1]Dry internal bond, psi: 160
[1]Tests carried out in accordance with ASTM 1037-72.

EXAMPLE 6

A specimen of wood particle board was prepared using the procedure described in Example 1 with the following changes. The wood particles employed were ponderosa pine chips (same as Example 2) having a water content of 10 percent by weight. A batch of 525 g. of these chips was sprayed, using the method and apparatus described in Example 1, with 30 g. of a blend obtained by mixing 91 parts of weight of polymethylene polyphenyl polyisocyanate and 9 parts by weight of dilauryl N,N-diethylphosphoramide (prepared as described in Preparation 5). The sprayed chips were then pressed into a particle board of thickness ⅜″ using the procedure described in Example 1 with a platen temperature of 340° F. and a pressure of 500 psi maintained for four minutes. The particle board so formed was demolded and showed good release from the mold plates. The board was found to have the following physical properties:

Density, pcf: 41
[1]Modulus of rupture, psi: 2280
[1]Modulus of elasticity, psi: 273,000
[1]Dry internal bond, psi: 200
[1]Tests carried out in accordance with ASTM-1037-72.

EXAMPLE 7

A specimen of wood particle board was prepared using the procedure described in Example 1 with the following changes. The wood particles employed were ponderosa pine chips (same as Example 2) having a water content of 10 percent by weight. A batch of 525 g. of these chips was sprayed, using the method and apparatus described in Example 1, with 30 g. of a blend obtained by mixing 80 parts by weight of polymethylene polyphenyl polyisocyanate and 20 parts by weight of the α-styryl dilauryl phosphate prepared as described in Preparation 6. The sprayed chips were then pressed into a particle board of thickness ⅜″ using the procedure described in Example 1 with a platen temperature of 340° F. and a pressure of 500 psi maintained for four minutes. The particle board so formed was demolded and showed excellent release from the mold plates. The board was found to have the following physical properties:

Density, pcf: 39
[1]Modulus of rupture, psi: 1280
[1]Modulus of elasticity, psi: 180,000
[1]Dry internal bond, psi: 120
[1]Tests carried our in accordance with ASTM-1037-72.

EXAMPLE 8

A specimen of wood particle board was prepared using the procedure described in Example 1 with the following changes. The wood particles employed were ponderosa pine chips (same as Example 2) having a water content of 10 percent by weight. A batch of 525 g. of these chips was sprayed, using the method and apparatus described in Example 1, with 30 g. of a blend obtained by mixing 91 parts by weight of polymethylene polyphenyl polyisocyanate and 9 parts by weight of dilauryl chlorophosphate (prepared as described in Preparation 1). The sprayed chips were then pressed into a particle board of thickness ⅜″ using the procedure described in Example 1 with a platen temperature of 340° F. and a pressure of 500 psi maintained for four minutes. The particle board so formed was demolded and showed excellent release from the mold plates. The board was found to have the following physical properties:

Density, pcf: 42
[1]Modulus of rupture, psi: 2280
[1]Modulus of elasticity, psi: 311,000
[1]Dry internal bond, psi: 170
[1]Tests carried out in accordance with ASTM-1037-72.

EXAMPLE 9

A specimen of wood particle board was prepared using the procedure described in Example 1 with the following changes. The wood particles employed were ponderosa pine chips (same as Example 2) having a water content of 10 percent by weight. A batch of 600 g. of these chips was sprayed, using the method and apparatus described in Example 1, with 30 g. of the solution of dilauryl chlorophosphate in polymethylene polyphenyl polyisocyanate (prepared as described in Preparation 7). 525 g. of the sprayed chips were then pressed into a particle board of thickness ⅜″ using the procedure described in Example 1 with a platen temperature of 340° F. and a pressure of 500 psi maintained for four minutes. The particle board so formed was demolded and showed excellent release from the mold plates. The board was found to have the following physical properties:

Density, pcf: 39
[1]Modulus of rupture, psi: 1460
[1]Modulus of elasticity, psi: 241,000
[1]Dry internal bond, psi: 180
[1]Tests carried out in accordance with ASTM-1037-72.

EXAMPLE 10

A specimen of wood particle board was prepared using the procedure described in Example 1 with the following changes. The wood particles employed were ponderosa pine chips (same as Example 2) having a water content of 10 percent by weight. A batch of 1000 g. of these chips was sprayed, using the method and apparatus described in Example 1, with a mixture of 40.5 g. of polymethylene polyphenyl polyisocyanate (same as Example 1) and 4.5 g. of dilauryl octyl phosphate (prepared as described in Preparation 4). An aliquot of 525 g. of the sprayed chips was then pressed into a particle board of thickness ⅜″ using the procedure described in Example 1 with a platen temperature of 350° F. and a pressure of 500 psi maintained for four minutes. The particle board so formed was demolded and showed excellent release from the mold plates. The board was found to have the following physical properties:

Density, pcf: 40
[1]Modulus of rupture, psi: 2350
[1]Modulus of elasticity, psi: 267,000
[1]Dry internal bond, psi: 220
[1]Tests carried out in accordance with ASTM-1037-72.

EXAMPLE 11

A specimen of wood particle board was prepared using the procedure described in Example 1 with the following exceptions. A batch of 1000 g. of the same wood chips as used in Example 1 was sprayed, using the method and apparatus described in Example 1, with an emulsion of 38.64 g. of polymethylene polyphenyl polyisocyanate (same as Example 1), 9.66 g. of bis(dioleoylglyceryl) chlorophosphate (prepared as described in Preparation 11) and 1.4 g. of emulsifying agent (same as Example 1) in 96.6 g. of water. An aliquot of 525 g. of the sprayed chips was then pressed into a particle board of thickness ⅜″ using the procedure described in Example 1 with a platen temperature of 350° F. and a pressure of 500 psi maintained for 4 minutes. The particle board so formed was demolded and showed good release from the mold plates.

EXAMPLE 12

This example illustrates the preparation of a panel board from cellulosic animal waste using the procedure described in Example 1. A batch of 1000 g. of air dried horse manure was pulverized in a blender and sprayed, using the method and apparatus described in Example 1, with an emulsion of 45 g. of polymethylene polyphenyl polyisocyanate (same as Example 1), 5 g. of dilauryl chlorophosphate (prepared as described in Preparation 7) and 0.8 g. of emulsifying agent (same as Example 1) in 45 g. of water. The sprayed material (525 g.) was then pressed into a board of thickenss ⅜″ using the procedure described in Example 1 with a platen temperature of 350° F. and a pressure of 500 psi maintained for 4 minutes. The board so formed was demolded and showed good release. The board was found to have a modulus of rupture of 700 psi and a dry internal bond strength of 23 psi when tested in accordance with ASTM-1037-72.

EXAMPLE 13

This example illustrates the preparation of a panel board from inorganic particles. The particles used were hydrated alumina (Hydral 710: Alcoa). A batch of 650 g. of the hydrated alumina was mixed by manual stirring with a solution of 120 g. of polymethylene polyphenyl polyisocyanate (same as Example 1) and 10 g. of dilauryl chlorophosphate (prepared as described in Example 7) in 50 ml. of acetone. After the admixture was complete, the acetone was evaporated using air circulating oven and the residual coated particles were then pressed into a board of thickness ⅜″ using the procedure described in Example 1 with a platen temperature of 410° F. and a pressure of 500 psi for 4 minutes. There was thus obtained a tough board which released readily from the mold plates and which was found to show an increase of 0.43 percent by weight when immersed in water for 24 hours at room temperature without showing any signs of degradation or loss of strength.

We claim:

1. In a process for the preparation of particle board wherein particles of material capable of being compacted are contacted with a polyisocyanate composition and the treated particles are subsequently formed into boards by the application of heat and pressure, the improvement which comprises contacting said particles, in addition to the treatment with said polyisocyanate composition, with from about 0.1 to about 20 parts, per 100 parts by weight of said polyisocyanate, of a compound of the formula:

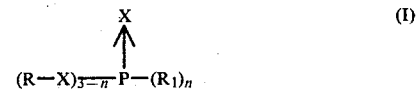

where R represents a member selected from the class consisting of alkyl having at least 3 carbon atoms, alkenyl having at least 3 carbon atoms, aryl, aryl substituted by at least one alkyl, lower-alkyl substituted by from 1 to 2 acyloxy groups wherein the acyl group is the residue of an aliphatic monocarboxylic acid having at least 2 carbon atoms, and

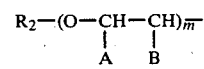

wherein
R$_2$ is selected from the class consisting of alkyl, aryl, and aryl substituted by at least one alkyl, one of A and B represents hydrogen and the other is selected from the class consisting of hydrogen, methyl, chloromethyl and 2,2,2-trichloroethyl, and m is a number having an average value from 1 to 25;

R$_1$ is a member selected from the class consisting of chlorine, bromine, lower-alkoxy, lower-alkylmercapto, arylamino, mono(lower-alkyl)amino, di(-lower-alkyl)amino, hydroxy(lower-alkylene)oxy, aryloxy, hydrocarbylureido, and an enol residue of the formula

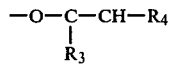

wherein
R$_3$ is hydrocarbyl, and R$_4$ is selected from the class consisting of hydrogen, hydrocarbyl, alkoxy and carbalkoxy, and R$_3$ and R$_4$ taken together represent the residue of a cycloalkenyl group;

X is a chalcogen selected from the class consisting of oxygen and sulfur; and n is an integer from 1 to 2; provided that, when n=1, one of the two R groups can also be selected from methyl and ethyl, and further provided that, when n=1, the two RX groups, taken together with the P atom to which they are attached, can additionally form the residue of a heterocyclic nucleus having from 5 to 6 ring atoms.

2. The process of claim 1 wherein said polyisocyanate is a polymethylene polyphenyl polyisocyanate containing from about 25 to about 90 percent by weight of methylenebis(phenyl isocyanate), the remainder of said mixture being oligomeric polymethylene polyphenyl polyisocyanates of functionality greater than 2.

3. The process of claim 2 wherein the polymethylene polyphenyl polyisocyanate contains from about 35 to about 65 percent by weight of methylenebis(phenyl isocyanate).

4. The process of claim 1 wherein said compound of formula (I) is methyl dilaurylphosphate.

5. The process of claim 1 wherein said compound of formula (I) is dilauryl chlorophosphate.

6. The process of claim 1 wherein said compound of formula (I) is butyl dilaurylphosphate.

7. The process of claim 1 wherein said compound of formula (I) is octyl dilaurylphosphate.

8. The process of claim 1 wherein said compound of formula (I) is hydroxypropyl dioleylphosphate.

9. The process of claim 1 wherein said compound of formula (I) is α-styryl dilaurylphosphate.

10. The process of claim 1 wherein said compound of formula (I) is N, N-diethyl dilaurylphosphoramide.

11. The process of claim 1 wherein said compound of formula (I) is a mixture of dilauryl chlorophosphate and lauryl dichlorophosphate.

12. The process of claim 1 wherein said compound of formula (I) is di(nonylphenyl) chlorophosphate.

13. The process of claim 1 wherein the compound of formula (I) is bis(dioleoylglyceryl) chlorophosphate.

14. The process of claim 1 wherein the particles employed in the preparation of said particle board are wood chips.

15. The process of claim 1 wherein said polyisocyanate and said release agent are applied simultaneously to said particles in the form of an aqueous emulsion.

16. The process of claim 15 wherein said aqueous emulsion of polyisocyanate also comprises an emulsifying agent.

17. The process of claim 1 wherein said particles are contacted separately with said polyisocyanate and said release agent.

18. The process of claim 17 wherein said polyisocyanate and said release agent are each employed in the form of an aqueous dispersion.

19. The process of claim 17 wherein said particles are contacted with water prior to being contacted with said polyisocyanate and said release agent.

20. In a process for the preparation of a particle board wherein particles of material capable of being compacted are contacted with a polyisocyanate composition and the treated particles are subsequently formed into boards by the application of heat and pressure, the improvement which comprises using as the polyisocyanate composition a polymethylene polyphenyl polyisocyanate containing a release agent produced in situ by reacting an alcohol R—XH with a phosphoryl halide PXHal$_3$ in the presence of said polymethylene polyphenyl polyisocyanate wherein R represents a member selected from the class consisting of alkyl having at least 3 carbon atoms, alkenyl having at least 3 carbon atoms, aryl, aryl substituted by at least one alkyl, lower-alkyl substituted by from 1 to 2 acyloxy groups wherein the acyl group is the residue of an aliphatic monocarboxylic acid having at least 2 carbon atoms, and

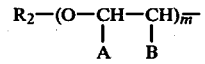

wherein R$_2$ is selected from the class consisting of alkyl, aryl, and aryl substituted by at least one alkyl, one of A and B represents hydrogen and the other is selected from the class consisting of hydrogen, methyl, chloromethyl and 2,2,2-trichloroethyl, and m is a number having an average value from 1 to 25, X is a chalcogen selected from the class consisting of oxygen and sulfur and Hal is a halogen selected from the class consisting of chlorine and bromine.

21. A process according to claim 20 wherein the polyisocyanate composition is a polymethylene polyphenyl polyisocyanate containing a release agent produced in situ by reacting lauryl alcohol with phosphoryl chloride in the presence of said polymethylene polyphenyl polyisocyanate.

22. A composition adapted for use as a particle board binder comprising a mixture of
(a) a polymethylene polyphenyl polyisocyanate containing from about 25 to about 90 percent by weight of methylenebis(phenyl isocyanate) the remainder of said mixture being oligomeric polymethylene polyphenyl polyisocyanates having a functionality higher than 2.0; and
(b) from about 0.1 parts by weight to about 20 parts by weight, per 100 parts by weight of said polyisocyanate, of a compound of the formula:

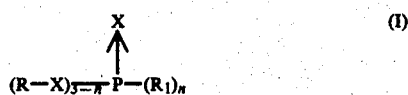 (I)

wherein R represents a member selected from the class consisting of alkyl having at least 3 carbon atoms, alkenyl having at least 3 carbon atoms, aryl, aryl substituted by at least one alkyl, lower-alkyl substituted by from 1 to 2 acyloxy groups wherein the acyl group is the residue of an aliphatic monocarboxylic acid having at least 2 carbon atoms, and

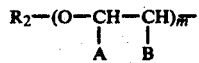

wherein
$R_2$ is selected from the class consisting of alkyl, aryl, and aryl substituted by at least one alkyl, one of A and B represents hydrogen and the other is selected from the class consisting of hydrogen, methyl, chloromethyl and 2,2,2-trichloroethyl, and m is a number having an average value from 1 to 25;

$R_1$ is a member selected from the class consisting of chlorine, bromine, lower-alkoxy, lower-alkylmercapto, arylamino, mono(lower-alkyl) amino, di(lower-alkyl) amino, hydroxy(lower-alkylene)oxy, aryloxy, hydrocarbylureido, and an enol residue of the formula:

 (II)

wherein
$R_3$ is hydrocarbyl and $R_4$ is selected from the class consisting of hydrogen, hydrocarbyl, alkoxy and carbalkoxy, and $R_3$ and $R_4$ taken together represent the residue of a cycloalkenyl group;
X is a chalcogen selected from the class consisting of oxygen and sulfur; and
n is a integer from 1 to 2; provided that, when n=1, one of the two R groups can also be selected from methyl and ethyl, and further provided that, when n=1, the two RX groups, taken together with the P atom to which they are attached, can additionally form the residue of a heterocyclic nucleus having from 5 to 6 ring atoms.

* * * * *

UNITED STATES PATENT OFFICE
CERTIFICATE OF CORRECTION

Patent No. 4,257,996      Dated March 24, 1981

Inventor(s) William J. Farrissey, Jr., Alexander McLaughlin, Reinhard H. Richter, Curtis P. Smith and Benjamin W. Tucker It is certified that error appears in the above-identified patent and that said Letters Patent are hereby corrected as shown below:

Column 19, claim 1, lines 16 to 18; the formula should appear as follows:

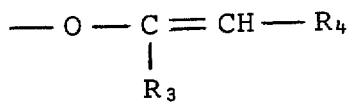

Signed and Sealed this

*Twenty-first* Day of *July 1981*

[SEAL]

*Attest:*

*Attesting Officer*

GERALD J. MOSSINGHOFF

*Commissioner of Patents and Trademarks*